United States Patent [19]
Sackinger

[11] Patent Number: 5,019,355
[45] Date of Patent: May 28, 1991

[54] ELECTRICAL DEVICE FOR CONVERSION OF MOLECULAR WEIGHTS

[75] Inventor: William M. Sackinger, Fairbanks, Ak.

[73] Assignee: University of Alaska, Fairbanks, Ak.

[21] Appl. No.: 485,856

[22] Filed: Feb. 22, 1990

Related U.S. Application Data

[63] Continuation of Ser. No. 102,361, Sep. 28, 1987, abandoned.

[51] Int. Cl.$^5$ .............................................. B10J 19/08
[52] U.S. Cl. .......................... 422/186.04; 422/186.18; 422/186; 204/172
[58] Field of Search ...................... 422/186.07, 186.18, 422/186.04, 186.21, 186, 186.01, 186.03, 186.29; 204/172

[56] References Cited

U.S. PATENT DOCUMENTS

| | | | |
|---|---|---|---|
| 919,445 | 4/1909 | Lohman | 422/186.19 |
| 1,010,777 | 12/1911 | Leggett | 422/186.18 |
| 1,037,500 | 9/1912 | Leggett | 422/186.01 |
| 1,983,028 | 12/1934 | Henry | 422/186.14 |
| 2,093,619 | 9/1937 | Powell | 422/186.18 |
| 2,710,835 | 6/1955 | Pardey | 106/148 |
| 3,565,776 | 2/1971 | Arff | 422/186.18 |
| 3,677,931 | 7/1972 | O'Hare | 422/186.04 |
| 3,842,286 | 10/1974 | Imris | 422/186.15 |
| 3,942,020 | 3/1976 | Ciambrone | 422/186.18 |
| 4,214,995 | 7/1980 | Saylor | 422/186.18 |
| 4,690,803 | 9/1987 | Hirth | 422/186.18 |
| 4,693,870 | 9/1987 | Gloor et al. | 422/186.19 |

Primary Examiner—Deborah L. Kyle
Assistant Examiner—J. Woodrow Eldred
Attorney, Agent, or Firm—Finnegan, Henderson, Farabow, Garrett & Dunner

[57] ABSTRACT

An electrical device is provided for the conversion of low-molecular-weight molecules, such as methane, into higher weight molecules, such as heptane and octane. The reaction chamber contains an array of parallel dielectric tubes, with a semiconducting layer beneath their inner surfaces which carries a current. During operation, electrons strike the inner surfaces of the tubes, ionizing molecules absorbed on the surfaces, which are then accelerated by the electric field and are carries to a new surface location, where they combine with absorbed molecules there to form a variety of new larger molecules. Excess hydrogen in the ionized condition is removed, being accelerated by the electric field to the opposite ends of the tubes. Under some conditions of operation, large molecules can be segmented into smaller ones. The controlled electron impact ionization in the device can also produce reactions among several molecular species which would be unlikely or impossible under normal chemical equilibrium conditions, or with normal catalysts.

40 Claims, 3 Drawing Sheets

ELECTRICAL DEVICE FOR CONVERSION OF MOLECULAR WEIGHTS

This application is a continuation of application Ser. No. 07/102,361, filed Sept. 28, 1987, now abandoned.

BACKGROUND OF THE INVENTION

1. Field of the Invention

The present invention relates to the conversion of the size of hydrocarbon molecules in a process stream, using an electrical method, and can be used either to combine small molecules into larger molecules or to separate larger molecules into smaller molecules.

2. Description of Prior Art

In the petroleum process industries, for many decades a thermal separation process has been applied to crude oil, which is a mixture of hydrocarbons, to separate out various fractions which are subsequently used for specific purposes. For example, diesel fuel, gasoline, lubricating oils, and asphalts are separated by vaporization and subsequent condensation at appropriate different temperatures and heights in a tower. The resulting yields of refined products are dependent upon the characteristics of the crude oil supplied, which will be different for each petroleum reservoir. The market demand for each category of refined products is variable in time, and therefore the adjustment of the petroleum refining process to changes in input composition and output demand can be difficult and challenging.

One remedy which has been recognized for many years is to convert larger molecules into smaller ones, a process called cracking, which has been normally accomplished by catalytic action on special surfaces at high temperatures. In this way, for example, an extra quantity of heavy oils can be converted into gasoline, which may be more marketable. Limitations of this approach include the cost of catalysts, the range of input molecules for which they are effective, and the thermal energy required for the process, which is difficult to recover.

On the other hand, the world supply of liquid hydrocarbons is also being consumed, and within only a few decades the known reserves will be exhausted. Two obvious alternatives involve the utilization of other natural sources of hydrocarbons which are in abundant supply: natural gas, and heavy oil. Keeping in mind that the majority of uses of petroleum in equipment use in our era have been for fuels in liquid form (such as gasoline, diesel fuel, jet fuel, and the like), and the transport of liquid fuel at normal atmospheric temperature and pressure is a decided advantage and has been designed into equipment in use today, it is clear that an important advantage would be derived from methods to convert natural gas (typically methane and ethane, $CH_4$ and $C_2H_6$) into liquids ($C_4H_x$ to $C_{10}H_y$, for example). Natural gas is easily withdrawn from reservoirs, and, if converted into higher molecular weight species, could readily be transported from remote source locations to consumers via existing liquid petroleum pipelines or ships, whereas in it's natural gaseous form or refrigerated liquid form, special-purpose pipelines and ships must be constructed, and the use of natural gas as a vehicle fuel by the consumer would require substantial investment in new equipment on vehicles. A process has in fact been built and operated commercially by the New Zealand government which produces some 14,450 barrels of gasoline per day using natural gas as a feedstock. It is a three stage process; the first producing hydrogen and carbon monoxide, the second producing methanol, and the third producing gasoline via the Mobil MTG (methanol-to-gasoline) process which uses a synthetic zeolite catalyst ZSM-5 (U.S. Pat. No. 3,702,886, Argauer and Landolt). The incorporation of zeolites into various reactor geometries is considered in U.S. Pat. Nos. 4,058,576 (Chang and Grover), U.S. Pat. No. 3,928,483 (Chang, Silvestri, and Smith), U.S. Pat. No. 3,931,349 (Kuo), U.S. Pat. No. 4,138,440 (Chang, Jacob, Silvestri, and Zahner), U.S. Pat. No. 4,197,418 (Lee and Yurchak), U.S. Pat. No. 4,046,825 (Owen and Venuto), and U.S. Pat. No. 4,251,484 (Daviduk and Haddad). Two difficulties with all of the processes based upon these patents are, firstly, that a multi-stage conversion process from natural gas to gasoline is involved, and, secondly, that high operating temperatures are involved (315 degrees C. to 450 degrees C.). Both difficulties lead to loss of energy and to high cost of initial equipment. An approach which involves a single-stage direct conversion, and in which the energy which is to be supplied to the reaction is specifically used to accomplish the molecular conversion, with a minimum waste as heat, would represent an improvement. Furthermore, the MTG process is limited as to the size of large molecules which may be formed, by the interior dimensions of the columns of the synthetic zeolite molecule. A process which allows the combination of molecules with virtually unlimited larger sizes would have additional uses in the production of lubricating oils and heavier fluids. The principle of molecular conversion thus has wide application.

Although the foregoing discussion of molecular conversion is oriented towards hydrocarbon gaseous-to-liquid conversion, it is obvious that compound gases containing other elements, such as oxygen, chlorine, flourine, bromine, nitrogen, sulfur, hydrogen, silicon, and other elements could be changed in composition in order to accomplish certain benefits, such as the diminution of toxicity prior to release into the natural environment, or the alteration of composition so as to render harmful gases into harmless liquids or gases prior to release into the environment. The chloroflourocarbon gases, for example, which interact with naturally-available ultraviolet radiation when they are present in the atmosphere, could be transformed into liquid forms in combination with other elements which would be relatively harmless. Accordingly, it is the object of this invention to provide an electrical device which will accomplish the function of combining molecules of low molecular weight into molecules of higher molecular weight. A further object of the invention is to provide an electrical device for separating molecules of higher molecular weight into other molecules of lower molecular weight. Moreover, an additional object of the invention is to provide an electrical device for combining two or more different molecular species into new molecular species.

SUMMARY OF THE INVENTION

Briefly, the present invention consists of a plurality of tubes, made of glass or ceramic, which have electrically semi-conductive inner walls. By applying a voltage from one end of this array of tubes to the opposite end, an electric field is established which is parallel with the interior surfaces. A weak source of electrons is located at or just outside of the negatively-connected side of the array, and these electrons are accelerated along the interior regions of the tubes, eventually striking the walls with energies which may range from several electron volts to more than a hundred electron volts. For electron flow, gas pressures less than 1 Torr are usually used, although operation at pressures several orders of magnitude higher is possible if volume electron/ion interaction effects are to be used as a supplemental improvement in operation. The gas which is to be converted is admitted into the chamber on the side of the tubular array which is opposite the electron source. Diffusion of the source gas into the tubular array takes place, with absorption of the gas molecules on the interior walls of the tube. Upon grazing impact of the electrons upon the interior walls of the tube, several processes take place, the most obvious of which is the disruption of molecular bonding of the absorbed gas. In the case of methane source gas, a hydrogen ion is created, $H^+$, which immediately is separated from its parent molecule by the action of the electric field. Hydrogen ions thus created are accelerated along the tube towards the negative end, striking the walls along the way and, upon impact, disrupting the bonding of the methane molecules and, as well, serving as an additional electron source via ion-induced secondary electron emission. The impact of electrons also creates secondary electron emission, with a net gain in electron flux along the length of the tube. Furthermore, once methane molecules are stripped of one or more hydrogen atoms, they have a net negative charge which, if they have been released from the wall surface by the energy associated with electron impact, causes them to be accelerated back towards the positive end of the tube. In such a state of activation, they will bond readily to other similar species upon collision with them, and the formation of carbon-carbon bonds is probable. Thus, by the repeated application of this process, formation of higher-order mixtures of paraffins, aromatics, olefins, and polyenes takes place, and a physical separation of the available hydrogen from the newly-formed higher-order hydrocarbon products is made possible by the electric field. Charge exchange is possible because of the flow of electrons through space, and the flow of electrical current through the semiconducting substrate. Energy for the dissociation is provided by the electric field which accelerates electrons, hydrogen ions, and complex hydrocarbon ions. Energy transfer is by direct impact at the interior surfaces of the tubes; volume interaction effects also take place at higher pressures, with similar results. Both chemi-absorbed molecules and physically absorbed molecules at the surface are affected and transformed by the electron impact process. The higher-order molecules are electrically moved to the region of higher inlet gas pressure, where they are carried by the inlet gas pressure gradient laterally to an outlet stream. A condensation stage then removes the higher-order species and the methane is recirculated through the device. The same device, if operated in a high electron flux mode, could decompose higher-order hydrocarbon molecules deposited on the walls of the tube near the output end, and a separate collecting electrode held at a greater positive voltage would attract such fragments. In this mode, lower molecular weight species could be produced from large molecules. It is clear that the admission of gaseous mixtures into this apparatus would result in a variety of output compounds, with a very large number of possibilities which could be considered, among which the detoxification of certain gases or liquids could take place. It is also clear that the hydrogen ions emerging from the negative-polarity ends of the tubes could be used to fragment large-molecular-weight hydrocarbon molecules in either a surface interaction or a volume interaction, and could combine with the fragments so that molecules of medium weight (for example $C_3H_x$ to $C_{10}H_y$) would be formed. Even pure carbon (such as coal) could be gasified in this way and the resulting hydrocarbons pumped away.

DESCRIPTION OF THE PREFERRED EMBODIMENTS

Figure 1:
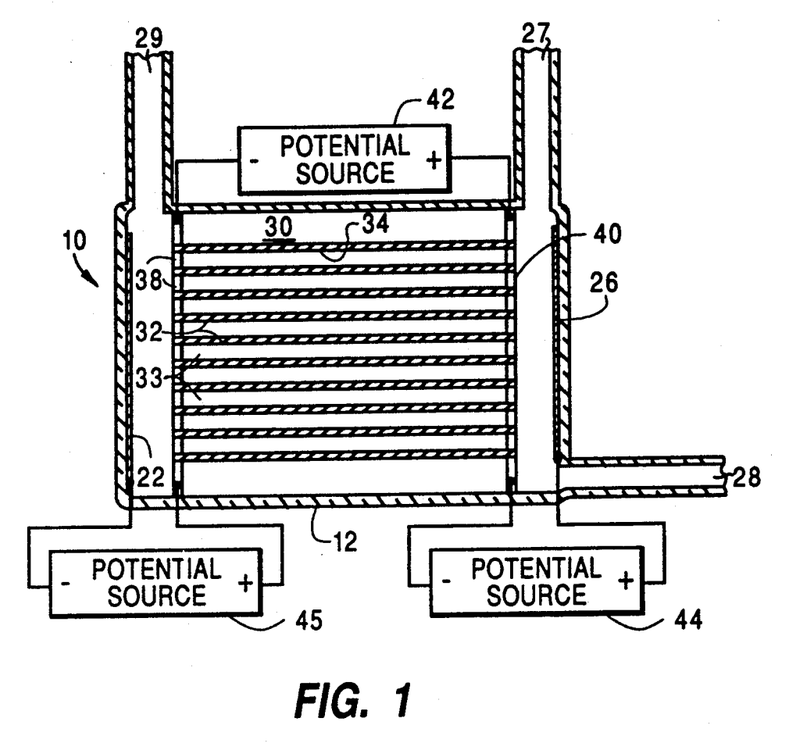
FIG. 1 is a section view of a simplified reaction chamber.
Figure 2:
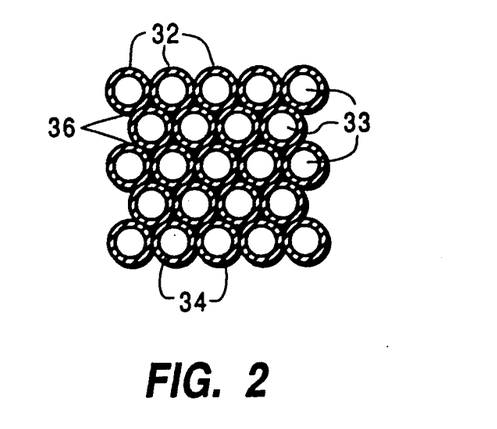
FIG. 2 is an end section view of part of the parallel array of tubes.

Referring now to the drawings and in particular to FIG. 1, there is shown an electrical device 10 for conversion of hydrocarbon molecular weights, comprising a chamber 12 with walls constructed of glass, ceramic, or metal, with an inlet gas source 27, an outlet gas port 28, and a hydrogen outlet gas port 29. Disposed upon or near the inside wall of chamber 12 is an electrode 26 constructed of metal, and on the opposite side of chamber 12 is another electrode 22 constructed of metal or a suitable semiconducting material, which can serve as an electron source. Within the central part of chamber 12 is mounted a plurality of tubular elements 32 which are joined together along their outer boundaries in an array 30 so that the axis of each tubular element 32 is disposed parallel with each other. The tubular elements 32 are composed of appropriate glass, glass ceramic, or ceramic, and are bound together by direct fusion of their boundaries 36 as shown in FIG. 2, or may also be bound together by means of a lower-softening-point glass applied at the boundaries 36. The interior of the tubes 32 are open cylinders 33 with interior surfaces 34 which have secondary-electron-emitting properties, and which have a zone of semiconducting material disposed just beneath the surfaces 34. Details of construction as described in U.S. Pat. No. 3,260,876 (Manley et. al.) could be used, for example. The plurality 30 of tubular elements is coated with metallic electrode material 38 and 40 such as gold, nickel, or aluminum on the faces 38 and 40, with the open cylinders 33 penetrating the metallic electrode material. Three potential sources are required, source 42 being connected between the faces 38 and 40 of the plurality 30 of tubular elements, source 44 being connected from electrode 40 to electrode 26, and source 45 being connected from electrode 22 to electrode 38. Connection of these sources through a glass or ceramic chamber 12 is shown, whereas if a metallic chamber wall is used, separate insulative feedthrough connections through the chamber wall would be required.

Briefly describing the operation of the device in the mode which increases hydrocarbon molecular weights, the input gas such as methane $CH_4$ or ethane $C_2H_6$ is admitted through port 27 into the chamber 10, with an ambient pressure of $10^{-6}$ to 1 Torr, for example. Diffusion of the gas into tubes 32 occurs, with some of the gas absorbing on the interior walls 34. Electrons originating either from the electron source 22, or from field emission from the edges of the metallic coating on face 38, or from cosmic rays, photoemission, or other natural sources, are accelerated along the length of the regions from source 22 to face 38, and onward towards face 40, striking the interior walls 34 enroute with substantial energies such as 10 to 100 electron volts. The range of energy values is adjustable with potential source 42. A sequence of cascading impacts takes place, which will be described below in detail, which removes hydrogen ions from the absorbed molecules, and allows hydrogen ions to move in the open cylinders 33 towards face 38, while at the same time allows negatively-charged hydrocarbon ions to move in the open cylinders 33 towards face 40. Subsequent impact of these hydrocarbon ions with other similar charged or neutral species causes combination into larger hydrocarbon molecules, which emerge from face 40 and are pumped away into outlet 28. Concurrently, the extracted hydrogen ions are carried by the electric field past face 38 where they combine with others of the same species and are pumped away into outlet 29. Some of the inlet methane will pass, by diffusion, directly into outlet port 28 and will be separated in subsequent condensation stages from the heavier hydrocarbon molecules formed by the device operation, after which the methane may be recirculated back into the inlet stream which feeds port 27.

Figure 3:
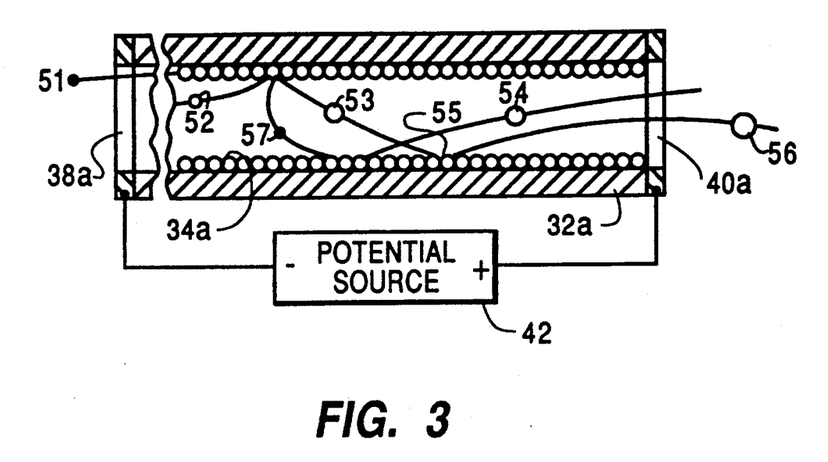
FIG. 3 is a section view of one such tube.

To further elaborate upon the details of the separation and recombination mechanism, with reference to FIG. 3, the methane molecules 55 may be considered to be absorbed upon the interior walls 34 in a strong, chemi-sorbed bond with silica or alumina, which pertains to a surface monolayer, and also in a weaker, multi-molecular-layer bond for additional molecules. When interior wall 34 is struck by an incident electron 51 with energy in the range 10 to 100 electron volts, a variety of processes are initiated. Some of the incident electron 51 energy goes to create secondary electrons 57 which ar emitted from the wall 34 and which are accelerated in parabolic trajectories to perpetuate the process at the next impact with wall 34 producing ion 54. Some of the incident electron 51 energy goes to separate a positive hydrogen ion 52 from an absorbed gas molecule 55, also creating a negatively-charged hydrocarbon ion 53, for example $CH_3$ or $CH_2$. Some of the incident electron 51 energy imparts sufficient kinetic energy to these ions 52 and 53 so that they depart from their surface creation site and are accelerated along the electric field direction, in parabolic paths. The hydrogen ion 52 will subsequently strike the wall 34 with sufficient energy to create secondary electrons which will contribute to the electron cascade required for the process; this is a positive ion feedback effect. The same impact of hydrogen ion 52 on wall 34 will also provide sufficient energy to disrupt the bonding of one or several gas molecules 55 absorbed at that site, thus creating more positive hydrogen ions and negative hydrocarbon ions which are released from that site and which are accelerated in opposite directions along the electric field direction, thus contributing to the process. The hydrocarbon ion 53, acquiring kinetic energy along it's parabolic path, strikes the wall 34 with energy sufficient to disrupt bonds of molecules 55 at the site of impact, permitting the formation of a carbon-carbon bond at that site, and thus the creation of a higher weight hydrocarbon molecule 56, which is shown in a negatively-charged ion state in FIG. 3 as it emerges from face 40 of the tube. At the site of formation of the carbon-carbon bond, other processes such as secondary electron production, and hydrogen ion production also may be expected to take place. In some cases, the higher-weight hydrocarbon may not leave the wall 34 immediately upon creation but will be dislodged by a subsequent electron or ion impact. The net trend of these processes may be summarized by noting that (a) electron and ion kinetic energy is applied to the surface zone where the hydrocarbon molecules are absorbed; (b) rupture of at least one of the hydrocarbon bonds leads to a species separation by means of the electric field; (c) the arrival of an energetic hydrocarbon ion at the surface zone further disrupts absorbed molecules and causes them to form carbon-carbon bonds; (d) higher weight molecules are moved, as ions, in a direction opposite that of the excess hydrogen, to the end of the device where they are pumped out.

Replenishment of methane molecules 55 on the surface will take place rapidly by diffusion and deposition from the gas phase present in the tube. Some degree of interaction between charged particles and neutral molecules in the volume space of the tube will also take place, with charge-separation and species separation trends as described for the walls 34, further enhancing the process.

The proper amount of charge required for electron current conservation at each impact site is provided by a small current flowing in a semiconducting layer just a few hundred Angstroms, or less, beneath the surface 34. Such a layer is easily formed by a prior high-temperature hydrogen reduction treatment of a lead-oxide aluminosilicate glass, for example.

The parabolic paths of the electrons and of the ions, as described above, have a length which depends upon the electric field strength and also upon the initial kinetic energy of the particles and their direction of emission from the surface. Inasmuch as the impact-creation of these charged particles involves the combination of many random processes within the wall 34, the direction and initial kinetic energy of the particles will follow a statistical distribution function. Some of these particles will follow trajectories which are very long, enabling them to acquire hundreds of electron volts of kinetic energy. This may lead to complete removal of hydrogen upon impact, with deposition of elemental carbon. Although this may be removed by subsequent impacts, it would be useful to contrive both a lower and an upper limit upon the range of impact energies, and for this reason the geometry of inclined channel axes as shown in FIG. 4 will be discussed.

Figure 4:
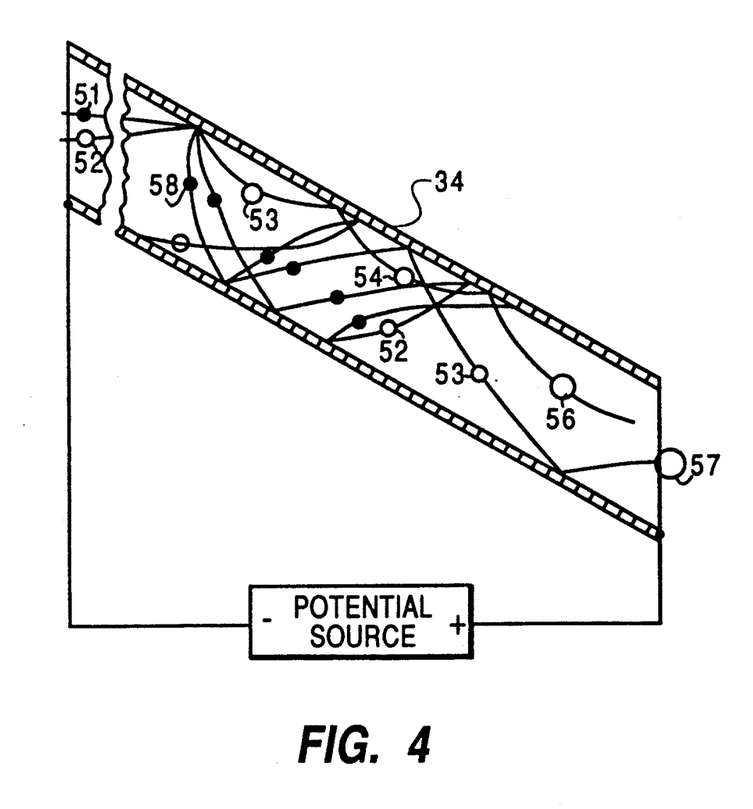
FIG. 4 is a section view of one such tube with an angle between electric field and tube axis.
Figure 5:
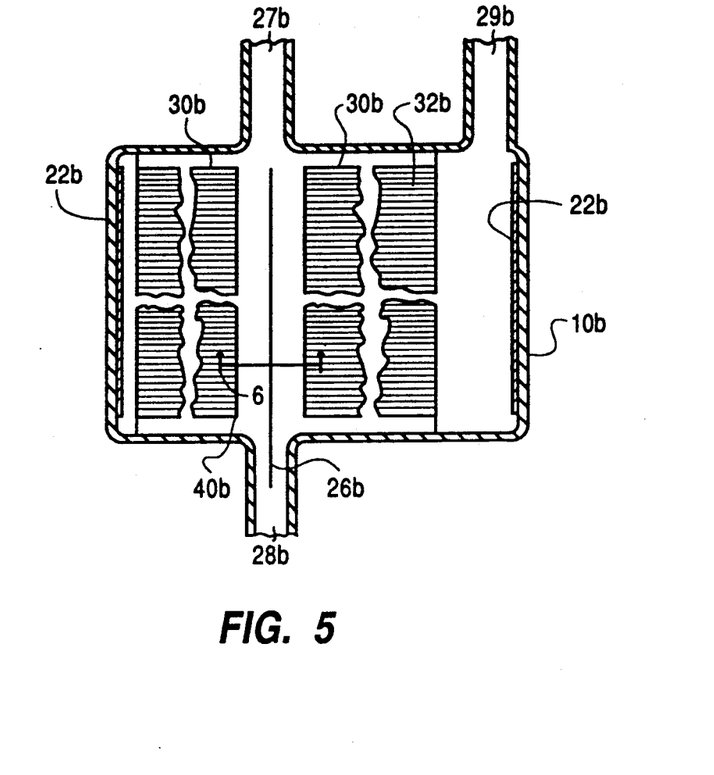
FIG. 5 is a section view of an axial-flow reaction chamber with quad-symmetric tube mounting.
Figure 6:
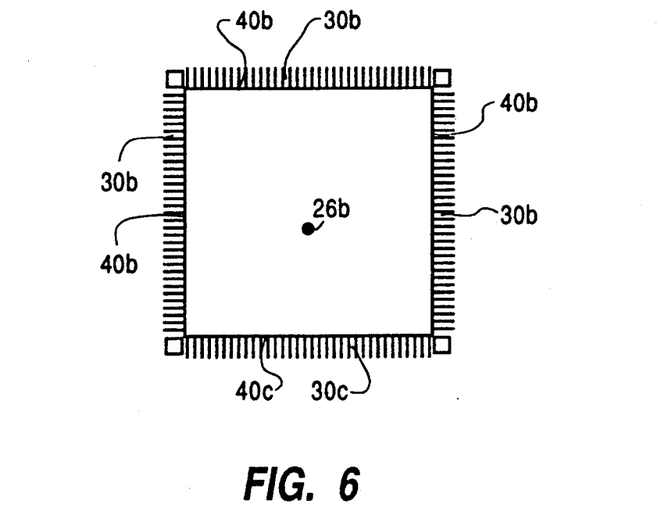
FIG. 6 is an end section view of part of the reaction chamber of FIG. 5.

With reference to FIG. 4, an angle is introduced between the electric field and the tube axis, by preparing the bundle of tubes and then slicing the bundle at such an angle. Molecules 55 are not shown in FIG. 4 for purposes of reducing complexity, but are present along the wall 34. Impact of electron 51 creates hydrogen ion 52, hydrocarbon ion 53, and secondary electrons 58. Since there is an angle between electric field and tubular axis the length of the parabolic paths is sharply limited. For example, if the electric field is 10 volts per diameter, path lengths of three diameters or less, with resulting impact energies of 30 electron volts or less can be arranged. Many more impacts along the length are thus possible, creating larger molecular ions 54, 56 and 57. The length of these tubes may extend from 10 diameters to 1000 diameters or more, and the combination of angle, electric field strength, length/diameter ratio, and total length can be chosen to optimize the conversion process in each particular case, depending upon input molecular species, flow rates, and desired spectrum of output molecular species, Various geometries can be utilized to expose an input molecular stream to many millions of the electrical reaction tubes. One possible configuration is illustrated in FIG. 5, where plurality of tubular elements 32b are disposed facing a central core region in an array 30b, with the most positive electrode 26b in the form of a rod at the center of the core region. The quad symmetry of this axial flow reactor is shown also in FIG. 6, which illustrates that the electrode 26b provides the electric field to draw the larger negatively-charged molecules from the tubular elements exit surface electrodes 40b. The potential sources 42, 44, 45 have deliberately been omitted from FIGS. 5 and 6 in the interest of drawing clarity, but are nonetheless essential to the operation and are connected as mentioned above. Inlet molecules from port 27b are converted in tubular elements 32b and higher-weight molecules are extracted at port 28b, with hydrogen extracted at port 29b. The flow of gas from inlet port 27b to outlet port 28b can be augmented by a magnetic field if desired to force converted charged molecules towards port 28b. In that case, one configuration could be a magnetic field of cylindrical symmetry which would be produced by a large current in the rod 26b, which would in such an instance penetrate the chamber wall 10b in two locations and which would be attached to a suitable current source. In accordance with well-known principles, the magnetic force on the charged particles would be in the direction of the axial flow. Such a magnetic field would also extend into the tubular elements 32b where it would increase the number of collisions of charged particles with the walls and in certain circumstances improve the conversion efficiency.

Inasmuch as the present invention is subject to many variations, modifications, and changes in detail, it is intended that all subject matter discussed above or shown in the accompanying drawings be interpreted as illustrative and not in a limiting sense. Such modifications and variations are included within the scope of this invention as defined by the following claims.

What is claimed is:

1. An apparatus for converting molecules having a first molecular weight into molecules having a second molecular weight, comprising:
    a reaction chamber means having chamber walls, inlet gas means, first outlet gas means, and second outlet gas means;
    a plurality of tubular means, each having a longitudinal axis, joined together in an array so that the longitudinal axes of said tubular means are disposed substantially parallel with each other, said array being mounted in said reaction chamber means and each of said plurality of tubular means having an interior surface exposed to said molecules having the first molecular weight, said surface having a semiconducting layer;
    a first external potential source electrically connected to said array of tubular means so that an electrical current flows through said semiconducting layers, and so that at least a portion of electrons of said current is available at said interior surfaces of said tubular means for providing charges for converting said molecules having the first molecular weight into said molecules having the second molecular weight.

2. An apparatus as claimed in claim 1, wherein said array has first and second ends and wherein said inlet gas means and said first outlet gas means are located adjacent to the first end of said array, said first end of said array being connected to a positive voltage terminal of said first external potential source, and said second outlet gas means is located adjacent to the second end of said array of tubular means.

3. An apparatus for recombining inlet gas molecules into outlet gas molecules of a different type, comprising:
    a first external potential source;
    tubular means having an interior surface exposed to said inlet gas molecules, said interior surface having a semiconducting layer electrically connected to said first external potential source so that an electrical current flows through said semiconducting layer and so that at least a portion of electrons of said current is available at said interior surface of said tubular means to provide charges for recombining said inlet gas molecules into said outlet gas molecules.

4. An apparatus as claimed in claim 2, wherein said first end and said second end of said array define respective planes, said planes being disposed at an angle of about 90 degrees with respect to the longitudinal axes of said tubular means.

5. An apparatus as claimed in claim 1, wherein said array has first and second ends, said apparatus including first electrode means located at the first end of said array and second electrode means located at the second end of said array, said first electrode means being connected to a positive voltage terminal of said first external potential source, and said second electrode means being connected to a negative voltage terminal of said first external potential source.

6. An apparatus as claimed in claim 5, including:
    third electrode means located substantially parallel to and separate from said first electrode means, fourth electrode means located substantially parallel to and separate from said second electrode means, a second external potential source, and a third external potential source, said first electrode means being connected to a negative voltage terminal of said second external potential source, said third electrode means being connected to a positive voltage terminal of said second potential source said fourth electrode means being connected to a negative voltage terminal of said third external potential source, and said second electrode means being connected to a positive voltage terminal of said third potential source.

7. An apparatus as claimed in claim 1, including at least a second one of said arrays, each of said arrays having a longitudinal axis and said arrays being disposed around a central axis such that the longitudinal axes of said arrays are directed orthogonally towards said central axis.

8. An apparatus as claimed in claim 7, including a second external potential source and a linear electrode means located near said central axis and connected to a positive voltage terminal of said second external potential source, wherein a negative voltage terminal of said second external potential source is connected to a positive voltage terminal of said first external potential source.

9. An apparatus as claimed in claim 6, wherein said fourth electrode means comprises a material having electron emission properties.

10. An apparatus as claimed in claim 1, including means for applying a magnetic field to said molecules having the first molecular weight.

11. An apparatus as claimed in claim 1, wherein said first external potential source generates a potential having a time-varying component and a static component.

12. An apparatus as claimed in claim 3, including a plurality of said tubular means, each having a longitudinal axis, joined in an array such that the longitudinal axes of said tubular means are disposed substantially parallel with each other.

13. An apparatus as claimed in claim 12, including a chamber having chamber walls, first inlet gas means, second inlet gas means, first outlet gas means, and second outlet gas means, said array being disposed in said chamber.

14. An apparatus as claimed in claim 13, wherein said array has first and second ends, said first inlet gas means, said second inlet gas means, and said first outlet gas means being located adjacent to the first end of said array, said first end of said array being connected to a positive voltage terminal of said first potential source, and said second outlet means being located adjacent to the second end of said array of tubular means.

15. An apparatus as claimed in claim 3, wherein said tubular means has a longitudinal axis and wherein said first end and said second end of said array define respective planes, said planes being disposed at an angle of about 90 degrees with respect to the longitudinal axis of said tubular means.

16. An apparatus as claimed in claim 3, wherein said tubular means has first and second ends, said apparatus including first electrode means located at the first end of said tubular means, and second electrode means located at the second end of said tubular means, said first electrode means being connected to a positive voltage terminal of said first external potential source, and said second electrode means being connected to a negative voltage terminal of said first external potential source.

17. An apparatus as claimed in claim 16, including a second external potential source, a third external potential source, third electrode means located substantially parallel to and separate from said first electrode means, fourth electrode means located substantially parallel to and separate from said second electrode means, said first electrode means being connected to a negative voltage terminal of said second external potential source, said third electrode means being connected to a positive voltage terminal of said second external potential source, said fourth electrode means being connected to a negative terminal of said third external potential source, and said second electrode means being connected to a positive voltage terminal of said third external potential source.

18. An apparatus as claimed in claim 12 including at least a second one of said arrays, each of said arrays having a longitudinal axis and said arrays being disposed around a central axis such that the longitudinal axes of said arrays are directed orthogonally towards said central axis.

19. An apparatus as claimed in claim 18, including a second external potential source and a linear electrode means located near said central axis and connected to a positive voltage terminal of said second external potential source, wherein a negative voltage terminal of said second external potential source in connected to a positive voltage terminal of said first external potential source.

20. An apparatus as claimed in claim 17, wherein said fourth electrode means comprises a material having electron emission properties.

21. An apparatus as claimed in claim 12, including means for applying a magnetic field to said inlet gas molecules.

22. An apparatus as claimed in claim 3, wherein said first external potential source generates a potential having a time-varying component and a static component.

23. An apparatus as claimed in claim 1, wherein said tubular means has a first end and a second end, each of said first and second ends defining a respective plane being disposed at an angle of less than 90 degrees with respect to the longitudinal axes of said tubular means.

24. An apparatus for the conversion of a first substance having a first molecular weight into a second substance having a second molecular weight, comprising:
a chamber;
potential source means for providing an electric potential;
tubular means disposed in said chamber, said tubular means having semiconducting properties and having an interior surface exposed to said first substance; and
external source means coupled to said tubular means for supplying said first substance,
said potential source means being adapted to establish an electric field in said chamber, said electric field having a significant component parallel to a longitudinal axis of said tubular means.

25. An apparatus according to claim 24, further comprising a plurality of said tubular means disposed in said chamber.

26. An apparatus according to claim 25, wherein each of said plurality of tubular means has a longitudinal axis and said plurality of tubular means are connected in an array such that the longitudinal axes of said plurality of tubular means are parallel to each other.

27. An apparatus according to claim 26, further including a plurality of said arrays disposed in said chamber.

28. An apparatus according to claim 27, wherein each of said plurality of arrays has a longitudinal axis and said plurality of arrays are arranged around a central axis such that said longitudinal axes of said arrays are orthogonal to respective planes containing said central axis.

29. An apparatus according to claim 24, further including means for collecting said second substance.

30. An apparatus according to claim 24, wherein said external source means includes a gas inlet connected to said chamber.

31. An apparatus according to claim 24, wherein said potential source means includes means for emitting electrons into said tubular means.

32. An apparatus according to claim 24, wherein said potential source means includes means for producing a potential having a static component and a time-varying component.

33. An apparatus according to claim 24, wherein said longitudinal axis of said tubular means is oriented at a relatively small angle with respect to said significant component of said electric field.

34. An apparatus for the conversion of a first substance having a first molecular weight into a second substance having a second molecular weight, comprising:
- a chamber having an inlet means for introducing said first substance into said chamber and an outlet means for removing said second substance from said chamber;
- hollow tubular means mounted in said chamber, said hollow tubular means having first and second ends with openings therein, and semiconducting properties on an interior surface; and
- electrode means coupled to said tubular means for providing an electrically conductive connection to said semiconducting interior surface.

35. An apparatus according to claim 34, further comprising a plurality of said tubular means disposed in said chamber.

36. An apparatus according to claim 35, wherein each of said plurality of tubular means has a longitudinal axis and said plurality of tubular means are connected in an array such that the said longitudinal axes of said plurality of tubular means are parallel to each other.

37. An apparatus according to claim 36, further including a plurality of said arrays disposed in said chamber.

38. An apparatus according to claim 37, wherein each of said plurality of arrays has a longitudinal axis and said plurality of arrays are arranged around a central axis such that said longitudinal axes of said arrays are orthogonal to respective planes containing said central axis.

39. A method for the conversion of a first substance having a first molecular weight into a second substance having a second molecular weight in a tubular means having semiconductive properties and a longitudinal axis, comprising the steps of:
- applying an electric field having a significant component parallel to the said longitudinal axis of said tubular means;
- introducing said first substance into said tubular means, said first substance reacting in response to electrons accelerated by said applied electric field to create said second substance; and
- collecting said second substance.

40. The method of claim 39, wherein said substance comprises a hydrocarbon.

* * * * *

UNITED STATES PATENT AND TRADEMARK OFFICE
CERTIFICATE OF CORRECTION

PATENT NO. : 5,019,355

DATED : May 28, 1991

INVENTOR(S) : William M. Sackinger

It is certified that error appears in the above-identified patent and that said Letters Patent is hereby corrected as shown below:

Title Page:
Abstract, line 10, "carries" should be --carried--.

Claim 19, col. 10, line 1, "in" should be --is--.

Signed and Sealed this

Eleventh Day of August, 1992

Attest:

DOUGLAS B. COMER

*Attesting Officer*    *Acting Commissioner of Patents and Trademarks*